April 26, 1960 R. M. MAULSBY 2,934,695
MEANS FOR INDICATING LENGTH OF APPARATUS-SUSPENDING
ELEMENT IN EARTH BOREHOLE
Filed April 26, 1955
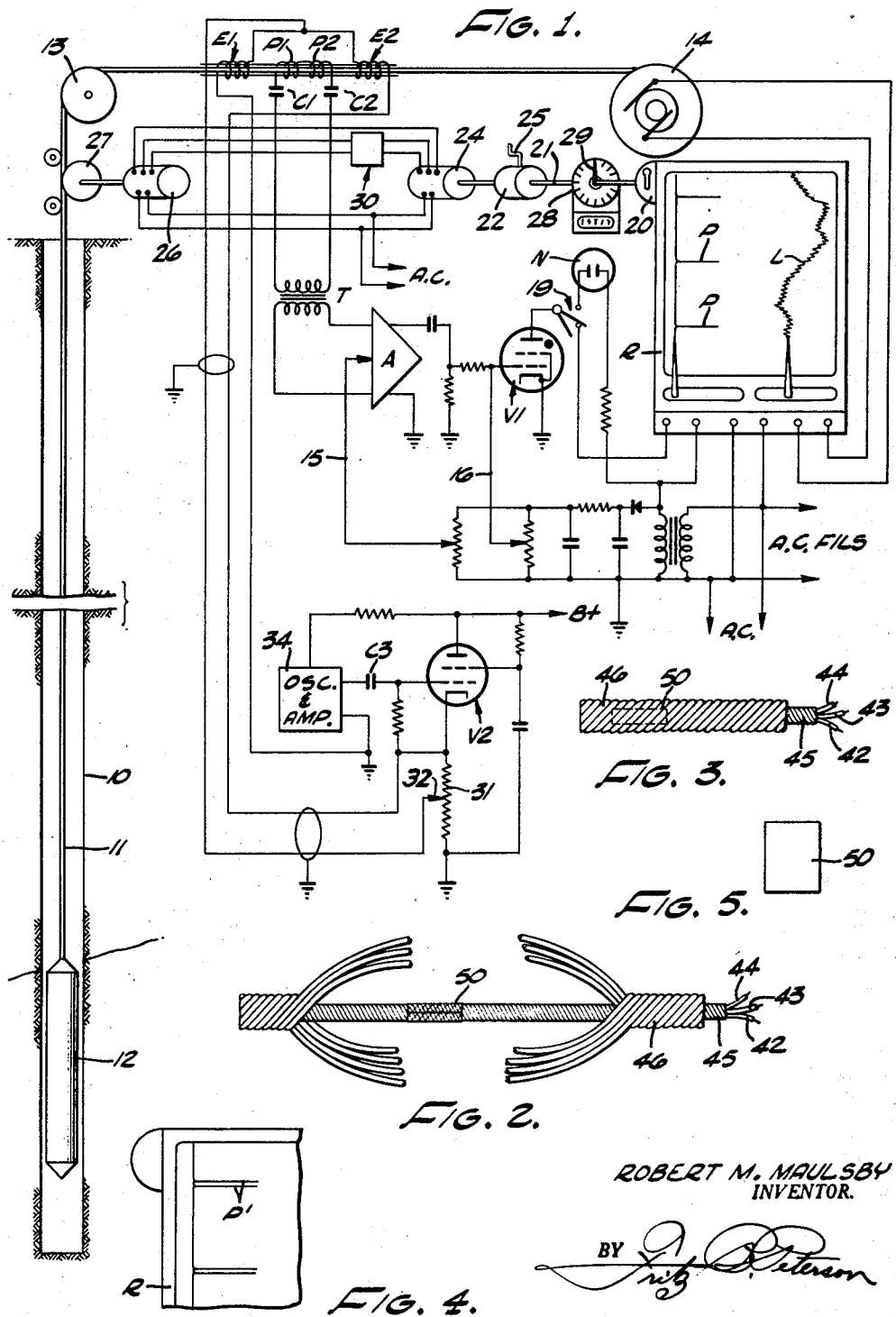
ROBERT M. MAULSBY
INVENTOR.
BY
AGENT United States Patent Office 2,934,695
Patented Apr. 26, 1960

2,934,695

MEANS FOR INDICATING LENGTH OF APPARATUS-SUSPENDING ELEMENT IN EARTH BOREHOLE

Robert M. Maulsby, Los Angeles, Calif., assignor, by mesne assignments, to Dresser Industries, Inc., Dallas, Tex., a corporation of Delaware Application April 26, 1955, Serial No. 503,906

6 Claims. (Cl. 324—34)

This invention relates to a mode and apparatus for measuring and indicating length of a suspending element payed out or withdrawn in traversing a suspended apparatus through an earth borehole. More particularly the invention relates to a means and associated method whereby the operator of a rig lowering or raising apparatus suspended by a suspending element in a borehole may be apprised as to the payed out or withdrawn length of the suspending element with respect to a known point outside the borehole, whether said suspending means is stationary or moving.

In certain operations performed in connection with deep earth boreholes such as oil wells, and as, for example, in logging and subsequent casing perforating operations, it is customary to lower apparatus into the borehole and to withdraw the apparatus from the borehole while forming one or more graphical records of data secured during the traverse of the length of the borehole. It is essential in these and similar operations that the location of such apparatus in the borehole with respect to a known reference point outside the borehole be immediately and accurately determinable so that the same or other suspended apparatus can with facility be accurately positioned or adjusted to a particular location in the borehole. As a typical example, there may be cited the necessity for locating perforating means accurately at an inaccessible location within a cased borehole where it is desired to perforate the casing preparatory to producing oil from the encircling formations, the location being at a known depth in the borehole.

It has heretofore been proposed to measure the payed out length of the suspending element, usually in the form of a steel wireline or cable, by visually counting flags applied to the cable at regular intervals, or, alternatively, by inducing magnetic "marks" at regularly spaced intervals in a ferromagnetic portion of the cable and detecting the magnetic "marks" by electromagnetic induction means as the marks passed toward or into the hole. For example, it has been proposed to traverse the apparatus-suspending cable past magnetic marking and detecting stations located a determined distance apart, applying an initial magnetic mark to the cable by magnetizing a small portion of its length, and thereafter triggering the marker means to apply another mark each time a mark passes through the detecting station; and to record the passage of the mark past the detecting station or some other given point on its way into the borehole. Thus the means provided a series of electromagnetic indications representing the length of cable payed into the well, which indications were susceptible of being counted or of providing signals which could be counted.

While satisfactory for certain types of borehole operations under favorable conditions and with ferromagnetic suspending cables, the prior art apparatus and mode for providing an indication of the measure of a cable run into the hole have been found to have several deficiencies and other undesirable characteristics. Among the latter may be listed the following:

(1) inability to provide a signal or indication when the magnetic mark was stationarily positioned at the detector station, which is necessary if maximum accuracy of positioning and measuring is to be obtained, (2) the magnetic impressions or marks are obliterated or removed by certain operations incident to some types of logging, necessitating renewal of the marks, (3) magnetization of portions of a ferromagnetic cable used for certain logging purposes has a deleterious effect upon the logging signals transmitted from the apparatus within the borehole to the location outside the borehole, or the marks rapidly deteriorate under certain circumstances, whereby the detector means may give false or incorrect indications, (4) the marks and the recording and detecting apparatus interfere with proper transmission of signals, currents, and/or voltages through the conductors of the cable in some instances; and (5) the magnetic marker system is not acceptable nor operable in the event the suspending element or cable is made of a nonmagnetic material such as Monel, bronze, stainless steel, nylon, and other synthetic filamentary materials.

Accordingly, it is an object of the present invention to provide a mode and means whereby the above-mentioned disadvantageous features of the prior art systems are obviated or eliminated.

Another object of the invention is to provide a novel apparatus suspending unit adapted for suspending and traversing apparatus in a borehole, and not subject to the disadvantages hereinabove mentioned.

Another object of the invention is to provide a system whereby measuring and indicating the length of suspending element payed out or withdrawn from an earth borehole may be accurately accomplished without the suspending element being continued in motion.

Another object of the invention is to provide a system whereby an indication of the depth of the apparatus suspended within the borehole may be secured and maintained while the suspending apparatus is stationary.

Another object of the invention is to provide a cable length marking and indicating system which is effective regardless of the material of which the cable is composed.

Another object of the invention is to provide a cable adapted for suspending apparatus in an earth borehole, which cable is provided with markers that can be detected while the cable is not in motion.

Another object is to provide an improved cable having incorporated in its structure means whereby payed out lengths of the cable may readily and automatically be indicated regardless of the material of which the cable is principally composed.

The foregoing and other objects and advantages which will hereinafter be made evident are attained by the invention, a preferred embodiment of apparatus of which is illustrated in the accompanying drawings and described with an explanation of the mode of operation thereof in the following specification.

According to the present invention the disadvantageous features of the aforementioned prior art systems are avoided by taking advantage of the fact that energy may be absorbed from an alternating electromagnetic field by a suitable device which is appropriately entered into that field. At an illustrative example, when an electrically conductive ring is introduced into such a field in a manner such that it cuts some of the magnetic flux (that is, when it distorts the field), a current is induced to flow around the circuit provided by the ring. The ring forms a short-circuited single-turn coil, and the current thus caused to flow in the short-circuited coil or turn require absorption of energy from the field. The absorption of energy is coincident with a deformation of the magnetic field from the form assumed prior to entry of the short-circuited turn. Such absorption of energy, or the incident deformation of the magnetic field, may be detected in several ways. For example, by placing a compass needle, or a coil of conductor in a part of the field that is thus deformed, the needle will be deflected, or a potential will be induced in the coil, whenever the field is deformed incident to entry of the short-circuited turn into the field.

In accordance with a preferred physical embodiment of apparatus illustrating the invention, an alternating magnetic field is caused to exist in a region through which the apparatus-suspending unit or cable is arranged to pass, and short-circuited electrically conductive turns or coils are suitably applied to or incorporated in the cable at intervals as "markers" so that as the cable passes into or through the magnetic field, a current is induced to flow in each marker as it passes through the field; and the resultant change is detected by a suitable detector. The detector may be in the form of one or more coils of insulated wire so situated with respect to the magnetic field, or with respect to the short-circuited turn marker, that a potential is induced in the detector by the distortion of the principal magnetic field, or by the magnetic field created by the current flowing in the short-circuited turn, or by both. Thus it is seen that the suspending unit or cable need not be of magnetic material, it being sufficient that the cable be provided with markers capable of distorting the magnetic field or of absorbing energy from the field.

In the interests of efficient apparatus and like considerations, the alternating magnetic field is, in the preferred form of apparatus, produced by a pair of coaxially arranged coils each situated to encircle the cable at spaced-apart points, and each energized with alternating current, the relative construction and disposition of the coils and their connections to the current supply being such that a pair of balanced and opposed magnetic fields is created with a neutral or null point coincident with a part of the line of travel or course of the cable. The detector means for cooperation with the field-producing coils and markers is preferably comprised principally of a pair of series-connected oppositely wound pick-up coils coaxially arranged with respect to the field-producing coils and disposed between the latter in slightly spaced-apart relation. The markers are preferably in the form of short lengths of electrically conductive material encircling at least a part of the cable and soldered or otherwise secured at the abutting or overlapping edges so as to form efficient short-circuited turns, and are affixed to the part of the cable they encircle.

The preferred embodiment of apparatus according to the invention is illustrated in the accompanying drawings, in which:

Figure 1 is a schematic diagram illustrating the nature and operational environment of the invention, electrical components according to a preferred embodiment being indicated in a circuit diagram and other parts of the apparatus being depicted diagrammatically;

Figure 2 is a view of a portion of a preferred type of apparatus-suspending unit in the form of a plural-armored electric conductor cable, a section of the outer armor or sheath having been cut away to show features of the interior of the cable, and a conductive mark according to the principles of the invention;

Figure 3 is a view of a portion of a cable such as is depicted in Figure 2 with the outer sheath in place over a conductive mark as comprehended by the invention;

Figure 4 is a fragmentary view of a recorder depicted in Figure 1 but showing a different form of graphical record; and Figure 5 is a view of an electrically conductive marker of the type applied to an apparatus-suspending unit in accord with a practice of the invention.

Referring now to Figure 1, there is diagrammatically depicted an earth borehole 10 in which is suspended and traversible by means of an apparatus-suspending unit in the form of a cable 11, a weighted apparatus comprising a case 12 which may be of any type customarily employed in borehole or well operations. It will be understood that the borehole and cable may be of great length, both having been greatly foreshortened in the drawing for clarity of illustration. Suspending unit or cable 11, which may also optionally serve, through insulated electric conductors optionally comprised in its construction, to convey electrical currents or potentials between apparatus in case 12 and other apparatus outside the borehole, may, insofar as most aspects of the invention are concerned, be of the ordinary stranded wireline type. The cable extends over a conventional guide pulley or sheave 13 situated at a location outside and above the borehole. In traversing apparatus case 12 from the top of the borehole toward the bottom of the borehole cable 11 is unwound or payed out from a suitable drum 14, upon which drum the cable is rewound in traversing case 12 in the opposite direction. The apparatus thus far enumerated may be of usual construction and form and, in the absence of modifications hereinafter described, forms no part of the present invention, but is diagrammatically depicted and described to illustrate the environment of the present invention.

As previously indicated, and as illustrated, the apparatus-suspending unit or cable 11 has applied thereto at suitable, preferably regular, intervals, short electrically conductive markers preferably of thin copper or other good electrically conductive material in the form of short bands or rings arranged in encircling relationship with at least a portion of the cable. As shown, the bands are disposed under the outer sheath or armor strands of the cable so they may be better protected from abrasion, but it will be understood that the bands may encircle all the elements of the cable, or but a single element.

At a suitable location along the reach of cable extending between drum 14 and sheave 13 there is provided a pair of serially and opposed connected field-producing or energizing coils E1 and E2 which are provided with alternating current power in a manner hereinafter more fully described to provide an alternating magnetic field in a region passed through by the cable. Coils E1 and E2 are spaced apart a short distance and have situated therebetween a pair of balanced induction pick-up coils P1 and P2, for the purpose previously noted. Coils E1 and E2 and P1 and P2 are coaxially arranged and so mounted that cable 11 extends axially therethrough in its passage between drum 14 and sheave 13. It is evident that if an alternating electric current is passed through opposed coils E1 and E2 a pair of opposed alternating magnetic fields will be created, each of which will include a short section of the cable extending therethrough. It will be evident that under the aforementioned circumstances each of coils P1 and P2 will link the field of a respective one of coils E1 and E2 and have induced therein an alternating potential whose magnitude will be dependent upon the relative proximity of the respective coil to its next adjacent exciting coil. Since coils E1 and E2 are connected in opposition, it will be evident that the potentials induced thereby in coils P1 and P2 will be in opposition, and if equal, will cancel. Further, it is evident that by properly shifting one or both of coils P1 and P2 axially toward or away from one or the other of energizing coils E1 and E2, a location may be arrived at at which the potentials induced in P1 and P2 will be equal and opposite, so that the net potential developed across coils P1 and P2 will be zero. With coils P1 and P2 thus positioned, it will be evident that as one of the aforementioned conductive ring or band markers enters one of the fields of energizing coils E1 or E2, the magnetic field will be distorted or varied with a consequent change in the potential induced in its associated one of the pick-up coils P1 and P2. Further, as the marker is continued along to a certain position approximately mid-way between coils P1 and P2, a position will be arrived at at which, once again, the magnetic fields will become balanced and the potentials induced in coils P1 and P2 will be equal and opposite and will cancel. Continued movement of the conductive marker as the cable is continued on its path through the several coaxially arranged coils will cause a similar unbalance of the other magnetic field with a second unbalance of the potentials generated in the coils P1 and P2, as is thought to be evident. Continued movement of the cable-carried conductive marker through and away from the other of the energizing coils E1 and E2 will result in the previously mentioned balance being once again restored, with the consequent production of zero net voltage across coils P1 and P2. If the cable and a marker are held stationary in one of the fields, a continuing potential will be generated across the series connected pick-up coils.

In accordance with the preferred form and embodiment of the invention, energizing coils E1 and E2 are provided with alternating current energy of a suitable frequency as, for example, 5,000 cycles per second, by suitable alternating current supply means. The latter means, as illustrated, comprises an electronic oscillator whose output may be, and preferably is, amplified as hereinafter described in greater detail. Presence of the conductive marker within the fields of coils E1 and E2, as indicated by generation of a net potential across coils P1 and P2, is utilized preferably after amplification to actuate suitable visual and/or graphical indicator means as hereinafter more fully described.

The alternating current potential induced in pickup coils P1 and P2 is transferred by way of capacitors C1 and C2 and a transformer T to a suitable conventional amplifier diagrammatically indicated at A, the output of which is applied to the control grid circuit of a thyratron tube V1. The circuit comprising capacitors C1 and C2 is designed to suppress currents of unwanted frequencies. The operation level of amplifier A is adjusted by means of a bias applied from a suitable source of direct current potential through a conductor 15 as indicated, whereby a threshold level may be set to restrict passage of the pick-up coil potential below a given level, permitting passage of a marker indication only when the pick-up coil potential is at a near maximum value. This bias potential may conveniently be derived from a potentiometer connected to the power supply as indicated. The operating threshold of thyratron V1 may be adjustably set by application to the control grid circuit thereof of a suitable biasing potential through a conductor 16 as indicated, the potential being derived as indicated. Amplifier A and the threshold level of thyratron V1 are so arranged and set as to eliminate the possibility of firing the thyratron by passage of minor cable irregularities or by "noise" potentials created in or passed through amplifier A. Thus thyratron tube V1 may be set to fire only when a marker has passed into one of the pickup coils P1 or P2. When the thyratron tube has been thus fired its output is used selectively to operate either or both of a flasher signal in the form of a neon tube N, and one channel of a conventional graphical recorder R. Selection of the application of the output of the thyratron to flasher N or recorder R, or both, is accomplished by suitable manipulation of a switch 19 indicated in Figure 1. As a result of the aforedescribed arrangement, as one of the markers passes into one or the other of the pickup coils, neon tube N may be made to flash and the left-hand recorder pen of recorder R may be made to displace to the right to form a pip or graphical representation such as indicated at P on the chart paper of the recorder. The chart paper of recorder R, which may be a multi-channel recorder of conventional manufacture, is preferably moved past the recording pens at a rate substantially proportional to the rate of passage of the cable into or from the borehole.

To this end the chart paper is driven or taken up by recorder-contained mechanism including gearing in a gear box 20, which gearing is operated by a shaft 21 forming part of or connected to the output of a manually controllable differential gear unit 22 as indicated in Figure 1. Differential gear unit 22 has provided as its primary input, rotation of the output shaft of a Selsyn motor 24; and has as its secondary input, motion conveyed by means of a correcting crank 25 which may be operated in a manner hereinafter more fully explained. Selsyn motor 24 is arranged through suitable electrical connections to be driven by the output of a Selsyn generator 26 which in turn is driven by a sheave 27 operated by the vertically coursing cable 11 being lowered into or withdrawn from the borehole 10. The Selsyn generator and Selsyn motor are supplied suitable primary power through alternating current leads as indicated in Figure 1. Output shaft 21 of the gear unit 22 is arranged to drive a conventional odometer 28 having a dial indicator with a pointer 29 driven directly by shaft 21. The gearing of unit 22 is preferably so proportioned with respect to the diameter of sheave 27 that pointer 29 of the odometer describes one revolution for each passage of the length of cable between successive cable markers past the periphery of sheave 27, that is, one revolution per marker or unit length of cable. By means of the secondary or auxiliary input to differential gear unit 22, that is, through operation of crank 25, the train of elements just described may be so set that the pointer of the odometer coincides with zero position on its dial at the time a cable marker is located midway between pickup coils P1 and P2. After the initial setting of the odometer pointer as described, crank 25 of the differential gear unit may remain stationary, or may be used to crank in any required correction, in a manner and for a purpose hereinafter more fully explained. It will be understood that in some instances it may be desirable to operate Selsyn generator 26 from sheave 13 rather than from sheave 27, in which case the relative diameters of the sheaves is to be taken into account in proportioning the gearing in units 22 and 20.

As hereinbefore indicated, alternating current to energize the excitation coils E1 and E2 may be supplied from any suitable source of alternating current. In the preferred embodiment of the invention the alternating current is supplied from a conventional oscillator by way of a cathode follower stage which comprises electron tube V2 and cathode resistor 31 as indicated in Figure 1. Electron tube V2 is fed the output of an oscillator 34, which may include an amplifier, by way of a coupling capacitor C3 connected to the control grid circuit of tube V2 as indicated. The cathode follower arrangement permits efficient supply of alternating current to the low impedance excitation coils E1 and E2 from the high impedance circuitry of the oscillator-amplifier. Alternating current power of suitable frequency and potential is supplied from a source "A.C." as indicated, to energize recorder R, to supply plate potential to the various electron tubes through a conventional "B" power supply unit (not shown), and to supply power for the filament units of the several electron tubes, as well as to supply negative bias potential to both amplifier A and thyratron tube V1 as hereinbefore indicated. These power supply means are only diagrammatically indicated in Figure 1 since they may be conventional power supply units well known in the art.

The nature and construction of the cable "marker" according to the invention is indicated by way of example in Figures 2 and 3 of the drawings. Referring to Figure 2, the cable may comprise one or more insulated electrical conductors 42, 43 and 44, which are enclosed and protected by an inner metallic sheath 45 comprised of a plurality of spirally applied strong elements or wires as indicated, and which inner sheath is surrounded by and protected by an outer sheath 46 shown partly open and partly broken away and comprising a plurality of elements or wires applied spirally in a direction opposite to that of inner sheath 45. Encircling inner sheath 45 is a short length of thin foil-like electrically conductive sheet whose adjoining longitudinally extending edges are securely soldered or brazed together to form an electrically conductive ring or turn encircling the inner sheath 45. One thin sheet of foil forming a short-circuited turn or marker is applied at each of the measured intervals along the length of the cable, preferably during manufacture thereof, or, alternatively, may be applied by temporary separation of the outer sheath 46 from the inner portion of the cable and application of the strip 50 to the inner part of the cable as indicated in Figure 2, the wires of the outer sheath 46 being then replaced or allowed to spring back into position to cover and protect the marker 50 as indicated in Figure 3. The markers 50 are applied to the cable at any desired intervals and are preferably applied at regularly spaced positions, unit distance apart along the length of the cable whereby, in effect, they separate or demark equal unit lengths of cable.

It will be evident from the preceding description that as cable 11 is payed off drum 14 in lowering apparatus case 12 into a borehole, and with alternating current supplied to energizing coils E1 and E2 as previously described, there will be produced or formed periodic indications in the form of double pulses of alternating current potential generated across pick-up coils P1 and P2. Each of these pulses as amplified by amplifier A will overcome the bias applied to the control grid of thyratron V1 and cause the latter to fire and permit current to flow therethrough and through one or the other or both of neon tube N and recorder R. Thus the recorder will be operated to form a graphical indication or record of the presence in, or passage of each of the conductive markers through, coils P1 and P2; and the tube N will be lighted to present a visible indication. The graphical indications formed on the chart of recorder R by the output of the thyratron may assume two different forms depending upon the speed of passage of the marker through or past coils E1—P1 and E2—P2. If the marker is traversed rapidly through the sets of coils the successive output pulses of the thyratron will be so closely spaced together in time that the recording pen of recorder R will have time to make but a single deflection, and consequently will form a graph of the nature of that indicated on the recorder at P in Figure 1. On the other hand, if one of the conductive markers is traversed slowly through the sets of coils the output pulses of current from thyratron V1 will be spaced apart sufficient in time for the pen or recorder R to form two complete and different traverses upon the chart paper and thereby form a graphical indication such as that illustrated at P' in Figure 4. Spacing of the graphical indications or pips indicated at P' will depend of course upon the relative speed of movement of the graph paper through the recorder with respect to the rate of motion of the cable into the borehole, and may be according to any desired selected scale. It will be evident that in the event switch 19 is positioned to supply an output pulse from thyratron V1 through neon tube N, the latter tube will be lighted each time tube V1 conducts. In the event recorder R is disconnected from the output of thyratron V1 visual examination or observation of neon tube N may be utilized in formulating a count of the number of markers passing the station occupied by pickup coils P1 and P2, and hence a count of the measure of the passed cable.

Thus the structure hereinbefore disclosed may be used in formulating either mental or graphical measures of the amount of cable run into the borehole, and with the odometer the measures may be checked. Additionally, when utilized with a plural channel recorder such as that indicated in Figure 1 in which the second channel of the recorder is utilized to make a graphical representation or log of some physical quantity being measured or otherwise explored within the borehole by the apparatus in case 12, the indications P formed upon the graph of the recorder may be utilized to correlate the recorded data with depth in the borehole or with data contained on another record. This is thought to be evident from an examination of the recorder diagrams of Figure 1, wherein graph L is the log or record of data secured by instrumentation contained in case 12 and transferred by way of the conductors of cable 11 to the recorder.

It has been found by experience that when an apparatus such as case 12 is lowered by a cable in a fluid-filled borehole, the tension exerted upon the upper portion of the cable as it is unwound from the drum does not reach a maximum value during the lowering of the apparatus into the borehole. This is due to resistance offered to passage of the apparatus and the cable through the borehole fluid, which may have a specific gravity and friction coefficient considerably in excess of that of water. When paying out or unwinding of the cable 11 from drum 14 is stopped, the apparatus case 12 will continue to be lowered in the borehole without additional registering of the odometer or turning of sheaves 13 and 27, as the cable in the borehole stretches to a certain extent. Also when cable 11 is commenced to be rewound upon drum 14 there will be some stretching and movement of the upper reaches of the cable prior to any upward movement of case 12, due to the addition of the fluid friction load to that supplied by gravity. As a consequence of the aforementioned fact, the total odometer reading as the apparatus is withdrawn from the borehole may differ from the reading produced as the apparatus is run into the bore hole. Since upon upward traverse of the apparatus the cable is under a slightly greater tension, the actual distance between successive markers will be slightly greater than was the case when the apparatus was lowered into the borehole. Thus it may be required that a slight correction be applied to the odometer and recorder drive whereby they will correctly indicate the location of the apparatus case 12 in the borehole. The provision of crank 25 in the differential gearing 22 provides a ready means for effecting such adjustment or correction. Since crank 25 may be rotated in either direction, either positive or negative correction may be applied, as required. Thus, by application of the proper correction to the odometer and the recorder, graphical representations secured as the apparatus case is lowered into the borehole may be accurately correlated with similar or other graphical representations obtained while traversing the apparatus case out of the bore hole. It will be understood that when the apparatus is being raised from the borehole the direction of movement of the graph paper or chart through the recorder may or may not be reversed, but is usually continued in the same direction. So the paper may be driven in either fashion, suitable means for reversing the input-output relationship of the gearing in gearbox 20, or, alternatively, for reversing the relative directions of rotation of Selsyn generator 26 and Selsyn motor 24 may be provided. In the latter case, for example, reversal of any two of the three secondary leads interconnecting the two Selsyn units may be readily effected to produce this reversal, as by means of a reversing switch 30 as indicated in Figure 1.

It will be evident that when one of the conductive markers is within either of the pickup coils P1 and P2, thyratron tube V1 will conduct and will continue to do so as long as the conductive marker remains within the respective pickup coil, due to the continuing absorption of energy by the marker and resultant production of potential across P1—P2. As a consequence of this fact, very accurate positioning of any apparatus within the borehole may be effected by lowering or raising the apparatus in the borehole until one of the conductive markers is within one of the pickup coils, after which the cable is either payed out or withdrawn the required number of inches or feet to accurately locate the apparatus as required or as indicated by the correlated or compared log. This ability of the apparatus of the invention to give a positive and continuous indication of the unit lengths of cable in the borehole while the cable is not moving is not possible with the aforementioned electromagnetic type markers used in the prior art, which require movement of the magnetic marker through the pickup coils for the production of an output signal. The present apparatus provides both a visible signal and a graphical representation of the presence of one of the conductive markers within a pickup coil while the cable is stationary. Since coils P1 and P2 are preferably in very close proximity to each other and closely adjacent the energizing coils E1 and E2 respectively, it can be appreciated that great accuracy of measurement of cable payed off into the borehole or withdrawn therefrom is attained. This accuracy may be accentuated by so adjusting the relative positions of coils E1, E2, P1 and P2, and by adjusting the "level" or intensity of the field produced by E1—E2, that a sharply defined "null" point is located between coils P1 and P2, at which the marker will have a sharply defined minimum effect between locations of maximum effect. The level of the field intensity may be adjusted by adjusting the tap 32 on resistor 31 of the cathode follower circuit.

While there has been illustrated a preferred form and disposition of apparatus according to the invention, it is evident that other forms and dispositions may be equally well employed, it being essential only that the marker means be such as to distort or extract energy from an alternating magnetic field if and while positioned in such field. The suspending unit may be a single element such as a single wire, or it may comprise a plurality of elements one or more of which are encircled by each of the energy absorbing markers. The cable may be of considerable longitudinal extent, or relatively short, but should comprise more than a single marker. The markers may be visible, but it is preferred to dispose them inside any outer sheath the cable may have for protective purposes. It will be evident that it is immaterial whether the detector means is so arranged that there is normally no voltage or potential generated therein, since only a change in such generated potential incident to presence of a marker is required, and such change may as well be a decrease as an increase in potential. The amplifier to which the potential is applied may be so constructed as to provide a triggering output to the thyratron tube in either type of operation.

From the preceding description and explanation of a preferred embodiment of the invention it will be seen that the aforementioned and other objects and advantages of the invention are accomplished thereby. It will be evident that modifications will occur to those skilled in the art, and accordingly I do not wish to be limited to the specific details of the disclosed embodiment, but what I claim is:

1. An elongated suspending means adapted for suspending and traversing apparatus along an extent of an earth borehole, comprising, in combination: a cable having an outer sheath of longitudinally-extending strands and an inner layer of longitudinally extending strands within said outer sheath; and means forming a longitudinally short, electrically short-circuited turn encircling said inner layer of longitudinally extending strands, and substantially covered by said outer sheath.

2. An apparatus for furnishing an indication of depth of suspension of apparatus suspended in an earth borehole, comprising, in combination: means including an elongated suspending means adapted to suspend and traverse apparatus through an earth borehole, said suspending means carrying a plurality of separate, substantially equally-spaced-apart electrically conductive bodies along its length; means to maintain a magnetic field at a location through which said suspending means is caused to pass by movement thereof into or out of said borehole; detector means situated adjacent said location to produce a signal in response to a change in said magnetic field at said location caused by movement therethrough of said conductive bodies carried by said suspending means; a movable recording medium; means to move said recording medium in correlation with said movement of said suspending means, and means responsive to said signal to produce a record on said recording medium concurrent with each such movement of said conducting bodies, to provide an indication of the depth of suspension of apparatus in the borehole.

3. An apparatus for furnishing an indication of depth of suspension of apparatus suspended in an earth borehole, comprising, in combination: means including an elongated suspending means adapted to suspend and traverse apparatus through an earth borehole, said suspending means carrying a plurality of separate, substantially equally-spaced-apart electrically conductive bodies along its length; means to maintain a magnetic field at a location through which said suspension means and said conductive bodies are caused to pass by movement thereof into and out of said borehole; detector means situated adjacent said location and sensitive to changes in said magnetic field at said location produced by movement therethrough of said conductive bodies; a movable recording medium; means to move said recording medium in correlation with said movement of said suspending means; and means responsive to said detector means to produce a record on said recording medium concurrent with each such movement of said conductive bodies, to provide an indication of the depth of suspension of such apparatus in the borehole.

4. An apparatus for furnishing an indication of depth of suspension of apparatus suspended in an earth borehole, comprising, in combination: means including an elongated suspending means adapted to suspend and traverse apparatus through an earth borehole, said suspending means carrying thereon a plurality of separate, substantially equally-spaced-apart, electrically conductive bodies along its length; means to maintain an alternating magnetic field at a location through which said suspending means and said conductive bodies thereon are caused to pass by movement thereof into or out of said borehole; detector means including an induction coil situated adjacent said location, said induction coil thereby being adapted to produce an alternating signal in response to a change in said alternating magnetic field at said location; a movable recording medium; means to move said recording medium in correlation with said movement of said suspending means; and means responsive to said alternating signal to produce a record on said recording medium of the occurrence of each such signal, to provide thereby an indication of the occurrence of such signals in correlation with the movement of said suspending means.

5. Apparatus according to claim 2 in which said means to move said recording medium in correlation with said movement of said suspending means includes adjustment means for varying the correlation of movement of said recording means relative to said movement of said suspending means.

6. An apparatus for furnishing an indication of depths of suspension of apparatus suspended in an earth borehole, comprising, in combination: means including an elongated suspending means adapted to suspend and traverse apparatus through an earth borehole, said suspending means carrying thereon a plurality of separate, electrically conductive bodies spaced-apart along the length thereof predetermined distances; means to maintain a pulsating magnetic field at a location through which said suspending means and said conductive bodies thereon are caused to pass by movement thereof into or out of said borehole, said magnetic field being thereby adapted to be distorted during passage of each of said conductive bodies therethrough; detector means including an induction coil situated adjacent said location, said induction coil thereby being adapted to produce a pulsating signal in response to a distortion of said pulsating magnetic field at said location; a movable recording medium; means to move said recording medium in correlation with said movement of said suspending means; and means responsive to said pulsating signal to produce a record on said recording means of the occurrence of each such signals, to provide thereby an indication of the occurrence of such signals in correlation with the movement of said suspending means.

References Cited in the file of this patent

UNITED STATES PATENTS

| | | |
|---|---|---|
| 1,797,864 | Harlandt | Mar. 24, 1931 |
| 2,065,118 | Davis | Dec. 22, 1936 |
| 2,065,119 | Davis | Dec. 22, 1936 |
| 2,466,251 | Martin | Apr. 5, 1949 |
| 2,477,099 | Thompson et al. | July 26, 1949 |
| 2,581,209 | Shepard et al. | Jan. 1, 1952 |
| 2,778,991 | Winkleman | Jan. 22, 1957 |